United States Patent
Sekizawa et al.

(10) Patent No.: US 9,569,021 B2
(45) Date of Patent: Feb. 14, 2017

(54) TOUCH PANEL AND METHOD OF MANUFACTURING THE SAME

(71) Applicant: FUJITSU COMPONENT LIMITED, Tokyo (JP)

(72) Inventors: Mitsuhiro Sekizawa, Tokyo (JP); Maiko Kikuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 306 days.

(21) Appl. No.: 13/901,801

(22) Filed: May 24, 2013

(65) Prior Publication Data

US 2013/0314351 A1  Nov. 28, 2013

(30) Foreign Application Priority Data

May 25, 2012  (JP) ................................ 2012-120090

(51) Int. Cl.
| | | |
|---|---|---|
| *G06F 3/041* | (2006.01) | |
| *B32B 37/14* | (2006.01) | |
| *G06F 3/045* | (2006.01) | |

(52) U.S. Cl.
CPC .............. *G06F 3/041* (2013.01); *B32B 37/14* (2013.01); *G06F 3/045* (2013.01); *G06F 2203/04103* (2013.01); *Y10T 156/10* (2015.01)

(58) Field of Classification Search
CPC  G06F 3/041; G06F 3/045; G06F 2203/04103; B32B 37/14; Y10T 156/10
USPC ............................................ 345/173; 156/60
See application file for complete search history.

(56) References Cited

U.S. PATENT DOCUMENTS

| | | | | |
|---|---|---|---|---|
| 2007/0085837 A1* | 4/2007 | Ricks | .................. | G02F 1/13338 345/173 |
| 2009/0079706 A1* | 3/2009 | Mishima | ............. | G02F 1/13338 345/173 |
| 2011/0128467 A1* | 6/2011 | Miyazaki | ............ | G02F 1/13338 349/61 |
| 2011/0151937 A1* | 6/2011 | Kusuda | ................. | G06F 1/1626 455/566 |
| 2011/0234514 A1* | 9/2011 | Gothard | ......................... | 345/173 |
| 2012/0062501 A1* | 3/2012 | Yao | .......................... | G06F 3/045 345/174 |
| 2013/0087374 A1* | 4/2013 | Nah | ........................ | G06F 3/044 174/258 |

(Continued)

FOREIGN PATENT DOCUMENTS

| | | |
|---|---|---|
| JP | 59-174663 | 11/1984 |
| JP | 2003-311842 | 11/2003 |

(Continued)

OTHER PUBLICATIONS

Notification of Reasons for Refusal for Japanese Application No. 2012-120090 dated mailed Mar. 29, 2016.

*Primary Examiner* — Kumar Patel
*Assistant Examiner* — Vinh Lam
(74) *Attorney, Agent, or Firm* — Staas & Halsey LLP

(57) ABSTRACT

A touch panel including a panel body and a gas passage provided in the panel body. The panel body includes a pair of electrode plates, and each electrode plate is provided with a conductive layer. The electrode plates are fixedly attached to each other so that conductive coats thereof are opposed to each other with a gap defined therebetween. The gas passage is configured to allow a gas existing in the gap to circulate in the panel body.

10 Claims, 14 Drawing Sheets

(56) References Cited

U.S. PATENT DOCUMENTS

| | | | | |
|---|---|---|---|---|
| 2013/0257744 A1* | 10/2013 | Daghigh | ............... | G06F 3/041 345/173 |
| 2013/0328820 A1* | 12/2013 | Kondoh et al. | ............... | 345/173 |
| 2014/0071353 A1* | 3/2014 | Nashiki | ............... | G02F 1/13338 349/12 |
| 2014/0368440 A1* | 12/2014 | Polyakov et al. | ............ | 345/173 |

FOREIGN PATENT DOCUMENTS

| | | | | |
|---|---|---|---|---|
| JP | 2004-94798 | | 3/2004 | |
| JP | 2008-192033 | | 8/2008 | |
| JP | 2011-8448 | | 1/2011 | |
| JP | WO 2012027243 A2 * | | 3/2012 | ............. B32B 37/10 |

\* cited by examiner

TOUCH PANEL AND METHOD OF MANUFACTURING THE SAME

CROSS-REFERENCE TO RELATED APPLICATIONS

This application is based upon and claims the benefit of priority of the prior Japanese Application No. 2012-120090, filed May 25, 2012, the entire contents of which are incorporated herein by reference.

BACKGROUND OF THE INVENTION

1. Field of the Invention

The present invention relates to a touch panel. The present invention also relates to a method of manufacturing a touch panel.

2. Description of the Related Art

In a touch panel as an input device including a transparent panel body, it is known that a sheet-shaped cover layer (hereinafter referred to as a cover sheet) which functions as protection, decoration, polarization, etc., is disposed on the outer surface or touch-input side of the panel body.

For example, Japanese Unexamined Patent Publication (Kokai) No. 2004-094798 (JP2004-094798A) describes a touch panel including a protection film bonded to the outer surface through a silicone rubber-based adhesive layer.

Japanese Unexamined Patent Publication (Kokai) No. 2008-192033 (JP2008-192033A) describes a touch panel including a polarization plate bonded to the entire outer surface by an adhesive.

In a touch panel including a cover sheet bonded to the entire outer surface of a panel body by an adhesive layer, it is preferred that the adhesive layer be prevented from trapping gas bubbles during a bonding process.

SUMMARY OF THE INVENTION

One aspect of the present invention provides a touch panel comprising a panel body including a pair of electrode plates, each electrode plate provided with a conductive layer, in which the electrode plates are fixedly attached to each other so that conductive coats thereof are opposed to each other with a gap defined therebetween; and a gas passage provided in the panel body and configured to allow a gas existing in the gap to circulate in the panel body.

Another aspect of the present invention provides a method of manufacturing a touch panel, the touch panel comprising a panel body including a pair of electrode plates, each electrode plate provided with a conductive layer, in which the electrode plates are fixedly attached to each other so that conductive coats thereof are opposed to each other with a gap defined therebetween; a cover sheet disposed on an outer surface of the panel body; and an adhesive layer for bonding the cover sheet to the outer surface of the panel body; the method comprising supporting the cover sheet on a surface of a support member; and pressing the cover sheet supported on the support member against the outer surface of the panel body with the adhesive layer interposed therebetween, wherein adhesive force of the adhesive member exerted between the cover sheet and the support member is smaller than adhesive force of the adhesive layer exerted between the cover sheet and the panel body.

DESCRIPTION OF THE EMBODIMENT

Figure 1A:
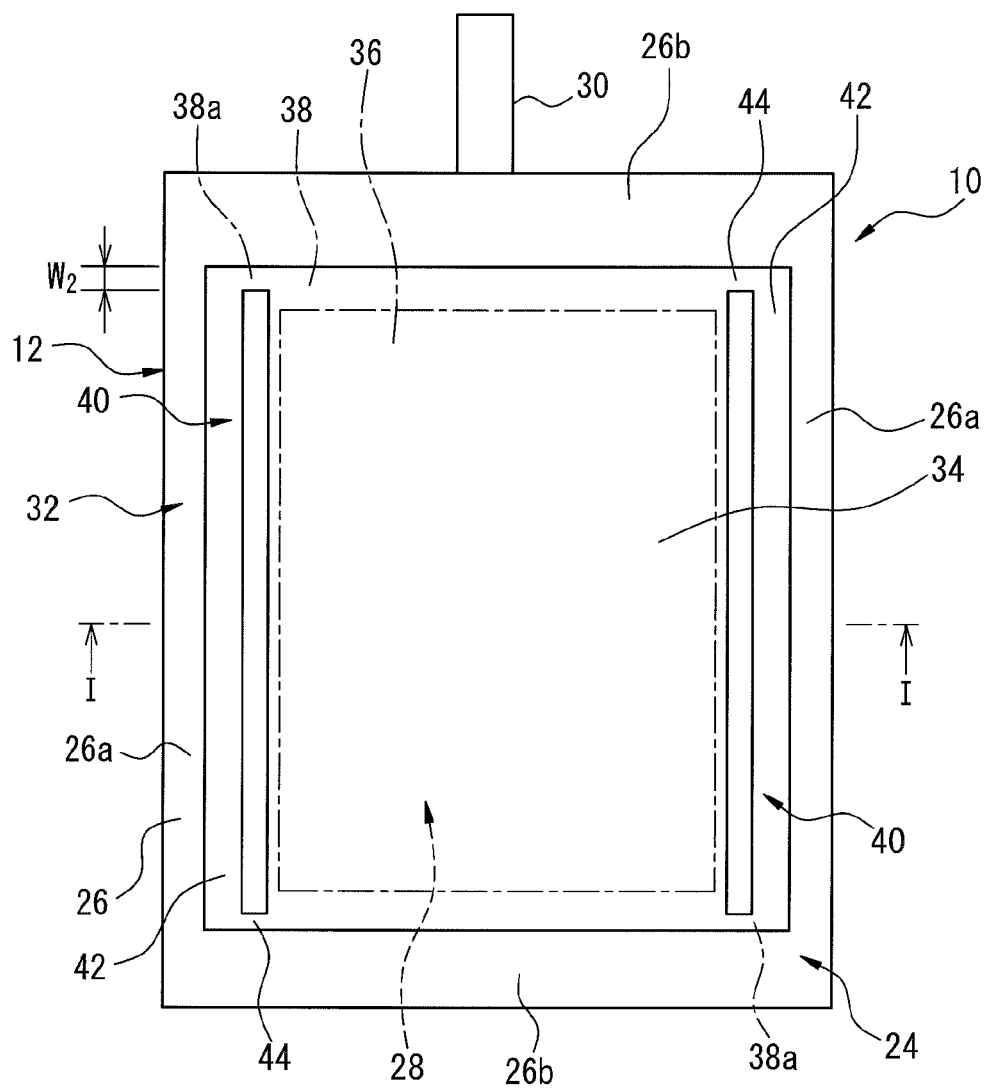
FIG. 1A is a plan view schematically depicting a touch panel according to one embodiment.

The embodiments of the present invention are described in detail below, with reference to the accompanying drawings. In the drawings, the same or similar components are denoted by common reference numerals.

Figure 1B:
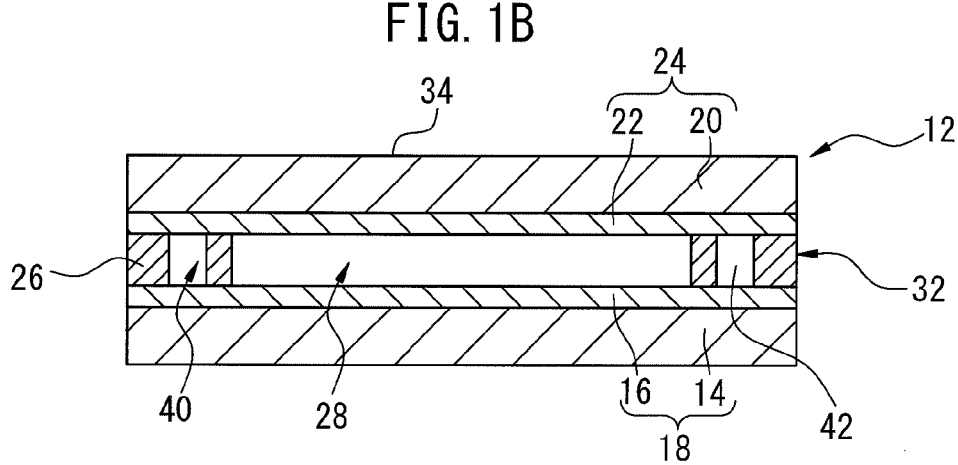
FIG. 1B is a sectional view taken along a line I-I of FIG. 1A.

Referring to the drawings, FIG. 1A depicts a touch panel 10 according to one embodiment in a plan view, and FIG. 1B depicts the touch panel 10 in a sectional view. The touch panel 10 of the embodiment has a resistive-type configuration that comprises a panel body 12 including a pair of transparent electrode plates, each provided with an electrically-conductive layer, in which the electrode plates are fixedly attached to each other so that the conductive coats thereof are facing each other with a gap defined therebetween.

As depicted in FIGS. 1A and 1B, the panel body 12 includes a first transparent electrode plate 18 including an electrically-insulating substrate 14 and an electrically-conductive layer 16 provided on a surface of the substrate 14, and a second transparent electrode plate 24 including an electrically-insulating substrate 20 and an electrically-conductive layer 22 provided on a surface of the substrate 20. The first and second electrode plates 18, 24 are mutually assembled in a relative arrangement that the conductive coats 16, 22 are facing and spaced from each other while permitting an electrically-conductive contact therebetween. The first and second electrode plates 18, 24 are fixedly attached to each other through an electrically-insulating adhesive layer (e.g., a double-faced adhesive tape) 26 disposed in a strip shape (in a rectangular frame shape in FIG. 1A) along the outer peripheries of the conductive coats 16 and 22. A gap 28 is defined between the conductive coats 16, 22, and gas (e.g., air) is encapsulated in the interior space of the panel body 12, including the gap 28, by the adhesive layer 26. Although not depicted, a plurality of dot spacers are provided in an appropriately dispersed arrangement on at least one of the conductive coats 16, 22, so as to prevent unintended contact or adhesion between the conductive coats 16, 22.

Although not depicted, the first electrode plate 18 is provided with a pair of strip-shaped, positive and negative electrodes formed in a predetermined pattern on the conductive layer 16 at positions spaced from and parallel to each other. The second electrode plate 24 is provided with a pair of strip-shaped, positive and negative electrodes formed in a predetermined pattern on the conductive layer 22 at positions spaced from and parallel to each other and different from the position of the electrode pair of the first electrode plate 18 by 90 degrees.

Although not depicted, each electrode plate 18, 24 is provided with a pair of conductors respectively connected to either one of the electrodes and formed in a predetermined pattern on an insulating layer provided in a region along the outer periphery of each conductive layer 16, 22. The conductors of the first and second electrode plates 18, 24 are collected at the ends thereof at a location in the outer periphery of the panel body 12, and connected to a connector (e.g., a flexible printed circuit board) 30 constituting an interface with a not-depicted control circuit.

The electrode pair, the insulating layer and the conductor, provided on each of the conductive coats 16, 22, and the adhesive layer 26 constitute an intermediate layer 32 interposed between the first and second electrode plates 18, 24 along the outer peripheries of the electrode plates 18, 24. The intermediate layer 32 also acts as a spacer for defining the gap 28 between the conductive coats 16 and 22 while an input operation is not performed.

The panel body 12 may be used, for example, in such a manner that the first electrode plate 18 is mounted and superimposed, as a support part, on a screen of a not-depicted display unit, such as a liquid crystal display (LCD), a plasma display panel (PDP), a cathode ray tube (CRT), etc., and the second electrode plate 24 is disposed, as an input operation part, at a location allowing an operator to perform a touch input thereon. In this arrangement, the surface of the substrate 20 of the second electrode plate 24 at a side opposite to the conductive layer 22 serves as an input operation surface 34.

The panel body 12 is provided with an operational region 36 allowing an input operation and a non-operational region 38 adjacent to the operational region 36. In the panel body 12 having a substantially rectangular shape of FIG. 1A, a rectangular region inside the intermediate layer 32 and including the gap 28 (a region surrounded by a dashed line in the drawing) constitutes the operational region 36, and a frame-shaped region outside the operational region 36 and including the intermediate layer 32 constitutes the non-operational region 38.

A region of a certain width along the inner periphery of the adhesive layer 26 constituting the intermediate layer 32, which includes a portion of the gap 28, is formed as a portion of the non-operational region 38 in consideration of the influence of the thickness of the adhesive layer 26. In the above configuration, the substrate 14 of the first electrode plate 18 as the support part may be formed from, e.g., a glass plate, a plastic plate, a plastic film, etc., and the substrate 20 of the second electrode plate 24 as the input part may be formed from, e.g., a plastic plate, a plastic film, etc.

Voltages are applied to each of the conductive coats 16, 22 of the electrode plates 18, 24 through the connector 30, the conductors and the electrode pairs, in directions orthogonal to each other. In this state, when an operator presses a point of the input operation surface 34 so as to make the conductive coats 16, 22 come into conductive contact with each other, a divided voltage corresponding to the resistance value of the respective conductive coats 16, 22 is measured at the pressed point, and a two-dimensional coordinate of the pressed point is detected. The above-described input-coordinate detection system has been known as an analog system. Note that the touch panel 10 may be configured as a resistive-type touch panel operating in a digital system, in which a conductive layer of each electrode is divided into strip-shaped parts on the surface of a substrate.

The touch panel 10 further includes a gas passage 40 provided in the panel body 12 and configured to allow gas existing in the gap 28 to circulate in the panel body 12. In FIGS. 1A and 1B, the gas passage 40 is formed in the adhesive layer 26 constituting the intermediate layer 32. More specifically, the adhesive layer 26 having a rectangular frame shape includes a pair of longer parts 26a extending along the long sides of the rectangular profile and a pair of shorter parts 26b extending along the short sides of the rectangular profile. A cavity 42 is formed in each longer part 26a so as to continuously extend in a longitudinal direction. An opening 44 is formed in a crossing point of each longer part 26a and each shorter part 26b, which corresponds to a corner 38a of the non-operational region 38, so as to open into the gap 28 and fluidically communicate the cavity 42 to the gap 28. Therefore, in the touch panel 10 of FIGS. 1A and 1B, two gas passages 40 are formed in the adhesive layer 26, in which each gas passage 40 is constructed by a single cavity 42 and a pair of openings 44 at longitudinally opposite ends of the cavity 42. Each gas passage 40 does not open into the outside of the panel body 12, and therefore, gas existing in the gap 28 is prevented from leaking through the gas passage 40 to the outside of the panel body 12, or gas, dust, etc., existing in an environment of the panel body 12 is prevented from entering the gap 28 through the gas passage 40.

In the touch panel 10 of FIGS. 1A and 1B, each of the cavities 42 and each of the openings 44 is formed by removing a certain portion of the adhesive layer 26 over the entire thickness thereof. The gas passage 40 thus configured may be produced by punching out and removing a portion of a double-faced adhesive tape, corresponding to the cavities 42 and the openings 44, in a process of forming the rectangular frame-shaped adhesive layer 26 from the double-faced adhesive tape and arranging the thus-formed adhesive layer 26 between the first and second electrode plates 18, 24.

Alternatively, the gas passage 40 may be separately formed from a rectangular frame-shaped member having longer parts with narrow widths and a pair of linear members adapted to be disposed parallel to the longer parts from a double-faced adhesive tape, and arranging the thus-formed members between the first and second electrode plates 18, 24 so as to correspond to the profile of the adhesive layer 26.

The touch panel 10 may include single gas passage 40 formed in either one of the pair of longer parts 26a of the adhesive layer 26. The function of the gas passage 40 will be described later in more detail.

Figure 2:
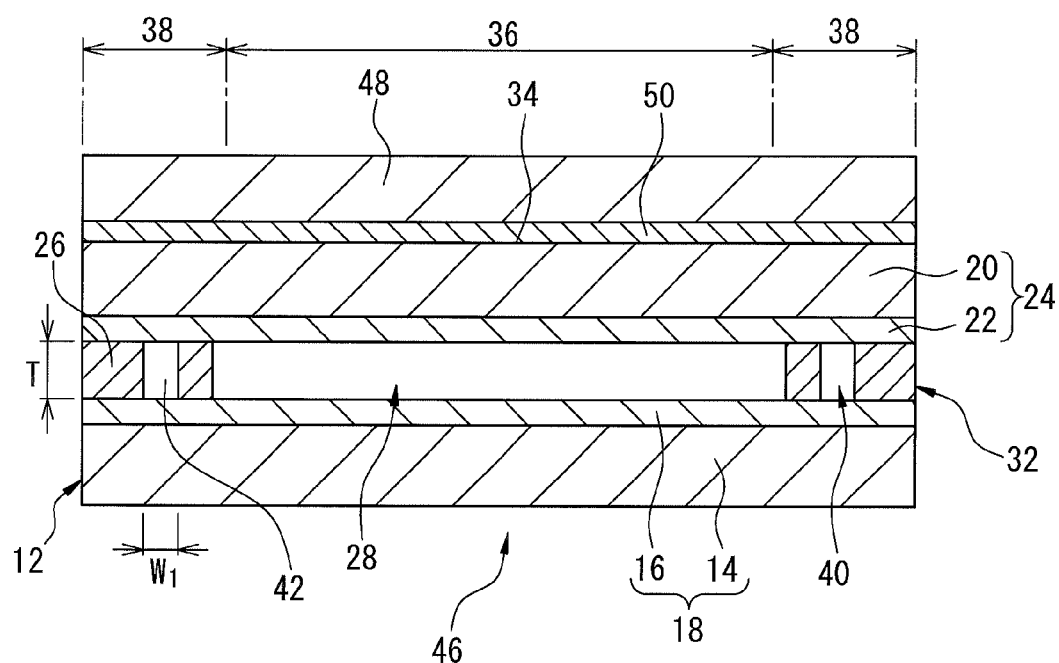
FIG. 2 is a sectional view corresponding to FIG. 1B and schematically depicting a touch panel according to another embodiment.

FIG. 2 depicts a touch panel 46 according to another embodiment in a sectional view corresponding to FIG. 1B. The touch panel 46 is configured by adding a cover sheet 48 having a function of protection, decoration, polarization, etc., to the touch panel 10. The configuration of components corresponding to the touch panel 10 is the same as that described with reference to FIGS. 1A and 1B. The corresponding components are denoted by the same reference numerals and a detailed description thereof will not be repeated.

The touch panel 46 includes the cover sheet 48 attached to the outer surface of the panel body 12, i.e., the input operation surface 34 of the second electrode plate 24, by a pressure-sensitive adhesive layer 50. The cover sheet 48 is a thin plate member having a rectangular shape in a planar view, and is entirely bonded to the entire input operation surface 34 by the adhesive layer 50. The cover sheet 48 may be made of a material, such as polyethylene terephthalate (PET), selected accordingly to a required function of protection, decoration, polarization, etc., and at least a portion thereof superimposed on the operational region 36 of the panel body 12 is made transparent. The touch panel 46 can prevent, due to the function of the gas passage 40, the adhesive layer 50 from trapping gas bubbles during a bonding process of the cover sheet 48.

The function of the gas passage 40 as to prevent the adhesive layer 50 from trapping gas bubbles will be described below with reference to FIGS. 3A to 5.

Figure 3A:
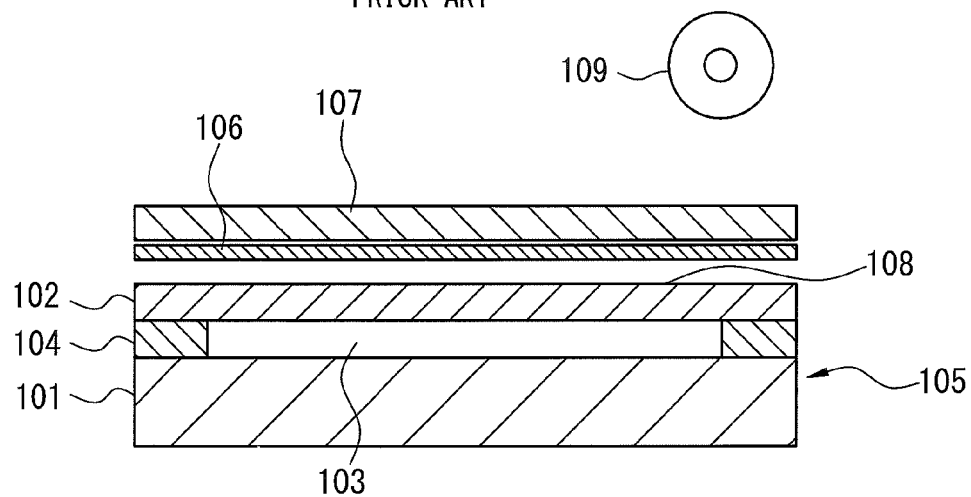
FIG. 3A is a sectional view diagrammatically depicting a preparation step in an exemplary process of bonding a cover sheet for a conventional touch panel.
Figure 3B:
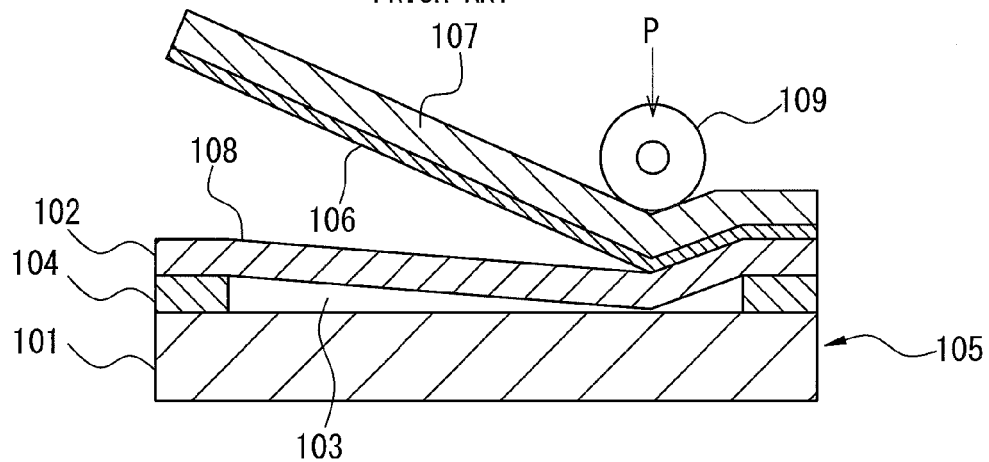
FIG. 3B is a sectional view diagrammatically depicting a state at the start of a bonding step in the exemplary process.
Figure 3C:
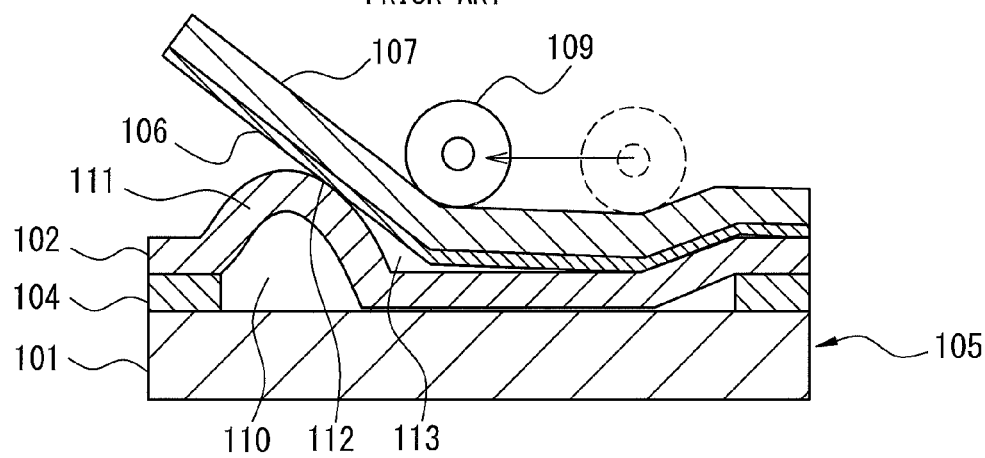
FIG. 3C is a sectional view diagrammatically depicting a state just before the completion of the bonding step of FIG. 3B.

FIGS. 3A to 3C diagrammatically depict an exemplary process of bonding a cover sheet. As illustrated in FIG. 3A, a roller for bonding a cover sheet 107 provided on one surface thereof with a pressure-sensitive adhesive layer 106 to an outer surface of a panel body 105 including a first electrode plate 101 and a second electrode plate 102 which are fixedly attached to each other through an adhesive layer 104 with a gap 103 defined therebetween is provided.

Next, as illustrated in FIG. 3B, the cover sheet 107 is disposed so that one peripheral edge thereof is superimposed on a corresponding peripheral edge of the panel body 105, and the cover sheet 107 is pressed with a pressing force P by the roller 109 against the outer surface 108 of the panel body 105 with the adhesive layer 106 interposed therebetween. When the cover sheet 107 is pressed against the outer surface 108 by the roller 109, the second electrode plate 102 of the panel body 105 is bent toward the first electrode plate 101 at a region subjected to the pressing force P, and the gap 103 is locally minimized.

From the state depicted in FIG. 3B, the roller 109 is moved so as to roll on the cover sheet 107 toward an opposite peripheral edge thereof while applying the pressing force P to the cover sheet 107. As the roller 109 rolls, the cover sheet 107 is gradually bonded to the outer surface 108 of the panel body 105 by the adhesive layer 106 and, at the same time, gas encapsulated in the gap 103 is gradually squeezed from one peripheral edge of the panel body 105 toward the opposite peripheral edge thereof. In a state just of FIG. 3C, the gas in the gap 103 is gathered near the peripheral edge of the panel body 105 so as to create a gas lump 110, and the second electrode plate 102 is locally bent outward so as to form a raised portion 111.

In the state depicted in FIG. 3C, the bonding of the cover sheet 107 performed with the rolling of the roller 109 is hampered by the raised portion 111 of the second electrode plate 102, and the adhesive layer 106 comes into contact with the raised portion 111 prematurely at a downstream contact point 112 along the moving direction of the roller 109. As a result, at an upstream side of the raised portion 111 along the roller moving direction, air 113 is trapped between the adhesive layer 106 and the second electrode plate 102. The trapped air 113 remains as gas bubbles in the adhesive layer 106 after the bonding of the cover sheet 107 is completed, which may influence a visibility of a touch panel through the cover sheet 107.

In contract to the technique depicted in FIGS. 3A to 3C, FIGS. 4A to 5 depict an exemplary process of bonding a cover sheet for the touch panel 10, 46. In the bonding process, a roller (e.g., a rubber roller) for bonding the cover sheet 48 having a rectangular shape on to which the adhesive layer 50 is provided to the input operation surface 34 of the panel body 12 having a rectangular shape and including the first electrode plate 18 and the second electrode plate 24 fixedly attached to each other through the adhesive layer 26 with the gap 28 defined therebetween is provided.

Figure 4A:
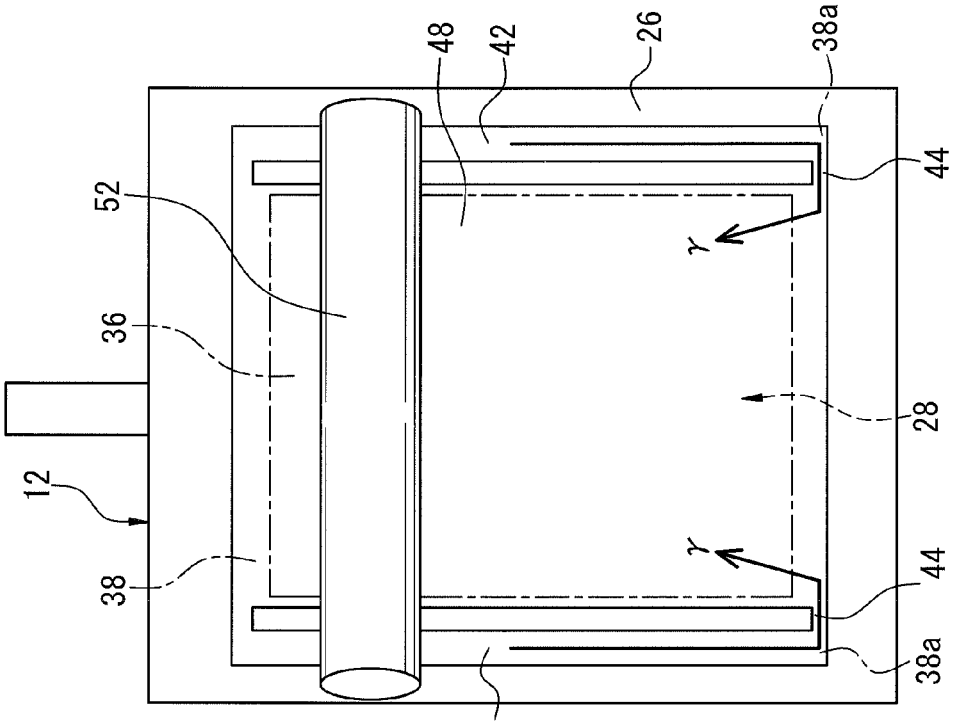
FIG. 4A is a plan view diagrammatically depicting a state at the start of a bonding step in an exemplary process of bonding a cover sheet for the touch panel of FIG. 1A or 2.
Figure 5:
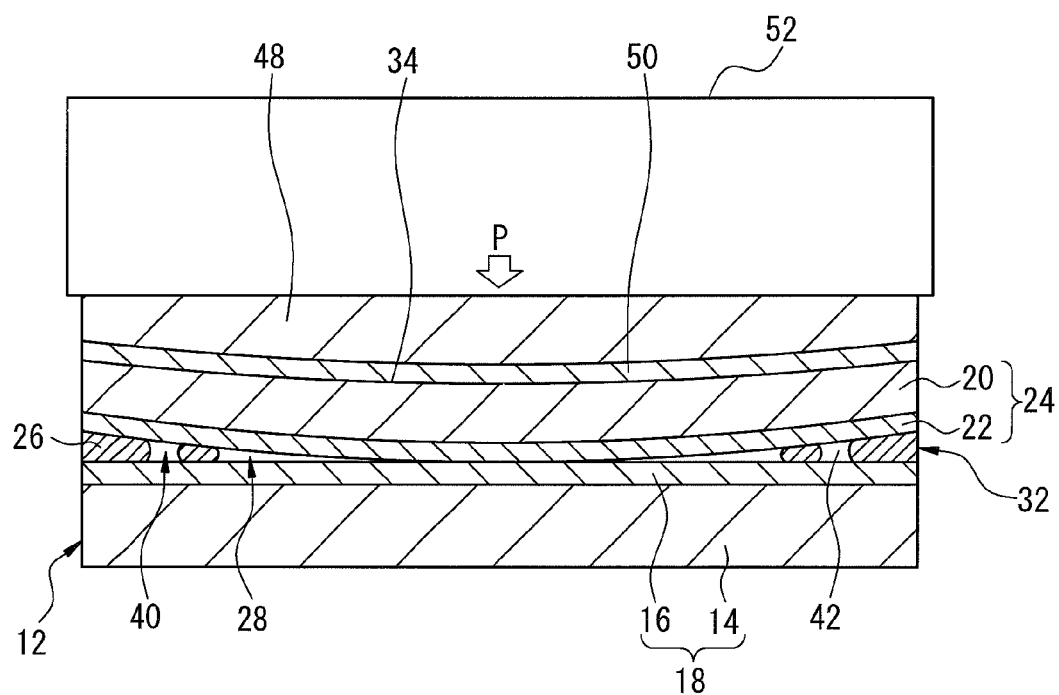
FIG. 5 is a sectional view taken along a line V-V of FIG. 4A.

Next, in a state of FIG. 4A, the cover sheet 48 is disposed so that one peripheral edge 48a thereof is superimposed on a corresponding peripheral edge 12a of the panel body 12, and the cover sheet 48 is pressed by the roller 52 against the input operation surface 34 of the panel body 12 with the adhesive layer 50 interposed therebetween. As depicted in FIG. 5, when the cover sheet 48 is pressed against the input operation surface 34 with a pressing force P by the roller 52, the second electrode plate 24 of the panel body 12 is bent toward the first electrode plate 18 at a region subjected to the pressing force P, and the gap 28 is locally minimized.

At this time, in the operational region 36, the second electrode plate 24 is deformed in such a manner that the gap 28 is substantially closed. On the other hand, in the non-operational region 38, the adhesive layer 26 acts to inhibit the deformation of the second electrode plate 24 and thus to prevent the two gas passages 40 from being closed.

From the state depicted in FIG. 4A, the roller 52 is moved so as to roll on the cover sheet 48 toward an opposite peripheral edge 48b thereof (depicted by an arrow α) while applying the pressing force P to the cover sheet 48. As the roller 52 rolls, the cover sheet 48 is bonded to the input operation surface 34 of the panel body 12 by the adhesive layer 50, while evacuating air from a gap between the adhesive layer 50 and the input operation surface 34. During this step, the gas encapsulated in the gap 28 is squeezed from one peripheral edge 12a of the panel body 12 toward the opposite peripheral edge 12b thereof due to the aforementioned deformation of the second electrode panel 24.

Figure 4B:
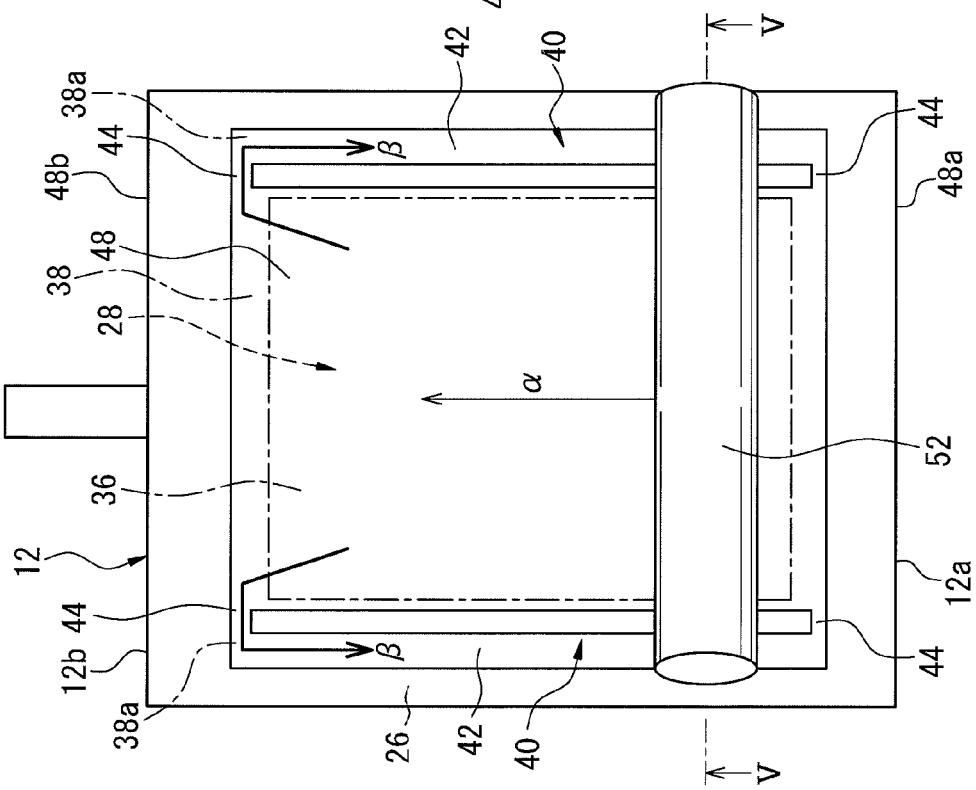
FIG. 4B is a plan view diagrammatically depicting a state just before the completion of the bonding step of FIG. 4A.

However, since the two gas passages 40 are not closed under the pressing force P, the gas squeezed toward the opposite peripheral edge 12b is allowed to pass through the opening 44 of each gas passage 40 formed at the corner 38a of the non-operational region 38 adjacent to the peripheral edge 12b, and enters the cavity 42 of each gas passage 40 (depicted by an arrow β). As depicted in FIG. 4B, as the roller 52 moves forward, the gas entering the cavities 42 from the gap 28 flows in the cavities 42 in a direction opposite to the moving direction of the roller 52, passes through the openings 44 formed at the corners 38a of the non-operational region 38 adjacent to the peripheral edge 12a, and enters the portion of the gap 28 in the operational region 36 (arrow γ) which the roller 52 has passed.

Thus, during bonding of the cover sheet 48, the gas existing in the gap 28 circulates in the panel body 12 through the gas passages 40 without outflowing from the panel body 12. Therefore, even in a state of FIG. 4B, unlike the technique depicted in FIGS. 3A to 3C, the gas in the gap 28 is prevented from gathering near the peripheral edge 12b of the panel body 12 to create a gas lump, and the second electrode plate 24 is prevented from locally bending outward to form a raised portion. As a result, the cover sheet 48 is entirely bonded to the input operation surface 34 by the adhesive layer 50 while smoothly evacuating air from a gap between the adhesive layer 50 and the input operation surface 34 as the roller 52 rolls. Consequently, the adhesive layer 50 in the touch panel 10, 46 is free from gas bubbles when the bonding of the cover sheet 48 is completed.

As described above, the touch panel 10, 46 has a configuration wherein the panel body 12 is provided with the gas passage 40 that allows the gas existing in the gap 28 to circulate in the panel body 12, and therefore, in the process of bonding the cover sheet 48 to the entire input operation surface 34 through the adhesive layer 50 by using the roller 52, it is possible to bond the cover sheet 48 while smoothly evacuating air from a gap between the adhesive layer 50 and the input operation surface 34. The gas passage 40 is formed in the intermediate layer 32 (the adhesive layer 26, in this embodiment) provided in the non-operational region 38, and does not influence a visibility of a screen of a display unit (not depicted) through the touch panel 10, 46. The gas passage 40 does not open into the outside of the panel body 12, and therefore, in the process of bonding the cover sheet 48, it is possible to prevent the gas existing in the gap 28 from leaking through the gas passage 40 to the outside of the panel body 12, and also prevent gas, dust, etc., existing in an environment of the panel body 12 from entering the gap 28 through the gas passage 40. Accordingly, the touch panel 10, 46 can prevent the adhesive layer 50 from trapping gas bubbles during the bonding process of the cover sheet 48, while eliminating deterioration in a screen visibility due to the existence of the gas passage 40, deterioration in an input operability due to the leakage of a gas in the panel, and deterioration in an environment resistance due to gas, etc., entering the panel.

In order to prevent the gas passage 40 from being closed by the pressing force P applied to the cover sheet 48 in the cover sheet bonding process, the cavity 42 may have a width $W_1$ equal to or larger than the thickness T of the adhesive layer 26 as illustrated in FIG. 2. For example, the width $W_1$ may be 10T or more, and the width $W_1$ may be 20T or less. Similarly, the opening 44 may have a width $W_2$ equal to or larger than the thickness T of the adhesive layer 26. For example, the width $W_2$ may be 10T or more, and the width $W_2$ may be 20T or less. As an example of a 10-inch size touch panel, the thickness of an adhesive layer is about 25 μm to about 200 μm, and the width of the adhesive layer is about 7 mm. In this case, each of the width $W_1$ of the cavity 42 and the width $W_2$ of the opening 44 may be set to the range of about 0.5 mm to about 5.0 mm.

The touch panel 10, 46 can prevent gas in the gap 28 from gathering near the peripheral edge 12b of the panel body 12 to create a gas lump while the cover sheet is bonded, since the openings 44 are provided at the corners 38a of the non-operational region 38 on both of the side of the bonding of the cover sheet 48 is started and the other side. In addition to the openings 44 as depicted, another opening for communicating the cavity 42 to the gap 28 may also be formed in an appropriate position.

Figure 6A:
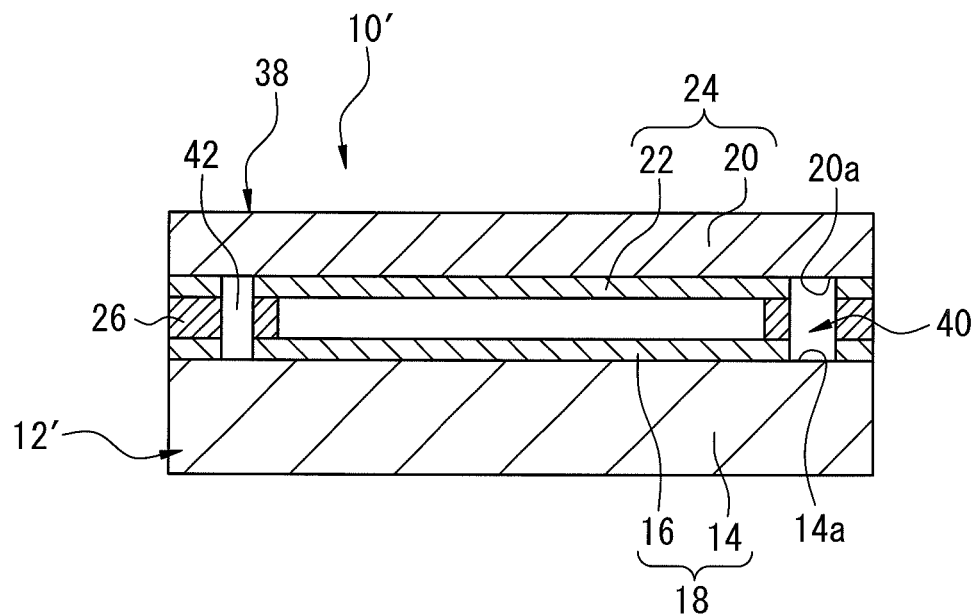
FIG. 6A is a sectional view schematically depicting a modification of the touch panel of FIG. 1A.
Figure 6B:
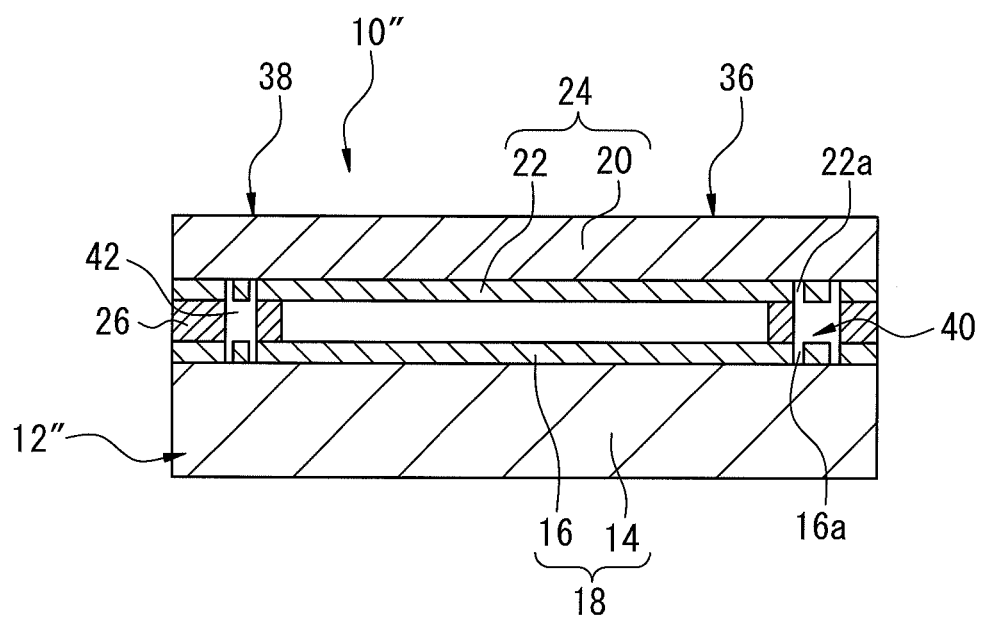
FIG. 6B is a sectional view schematically depicting another modification of the touch panel of FIG. 1A.

FIGS. 6A and 6B depict a modification of the touch panel in a sectional views corresponding to FIG. 1B. In a touch panel 10' depicted in FIG. 6A, the conductive layer 16, 22 of each electrode plate 18, 24 of a panel body 12' is partially removed at a location where the gas passages 40 are formed, and the surface 14a, 20a of the substrate 14, 20 of each electrode plate 18, 24 is exposed in the gas passages 40. In this configuration, even if the first and second electrode plates 18, 24 are unintentionally bent toward each other in the non-operational region 38 during the operation of the touch panel 10', it is possible to prevent output of an erroneous signal, which may otherwise be caused by short-circuiting of the conductive coats 16, 22 in the gas passage 40.

In a touch panel 10" depicted in FIG. 6B, the conductive layer 16, 22 of each electrode plate 18, 24 of a panel body 12" is electrically insulated by a slit 16a, 22a formed at locations between a portion disposed in the operational region 36 and a portion disposed in the gas passage 40. In this configuration, even if the first and second electrode plates 18, 24 are unintentionally bent toward each other in the non-operational region 38 during the operation of the touch panel 10", it is possible to prevent output of an erroneous signal, which may otherwise be caused by short-circuiting of the conductive coats 16, 22 in the gas passage 40.

The touch panel according to the invention may include gas passages of various configurations other than the gas passages 40 depicted in FIGS. 1A to 2. FIG. 7 to FIG. 11B depict touch panels according to various embodiments, which include gas passages of various configurations. The touch panels according to the depicted embodiments have configurations substantially corresponding to the touch panel 10, 46 depicted in FIGS. 1A to 2, except for the configuration of the gas passage. The corresponding components are denoted by the same reference numerals, and a detailed description thereof will not be repeated.

Figure 7:
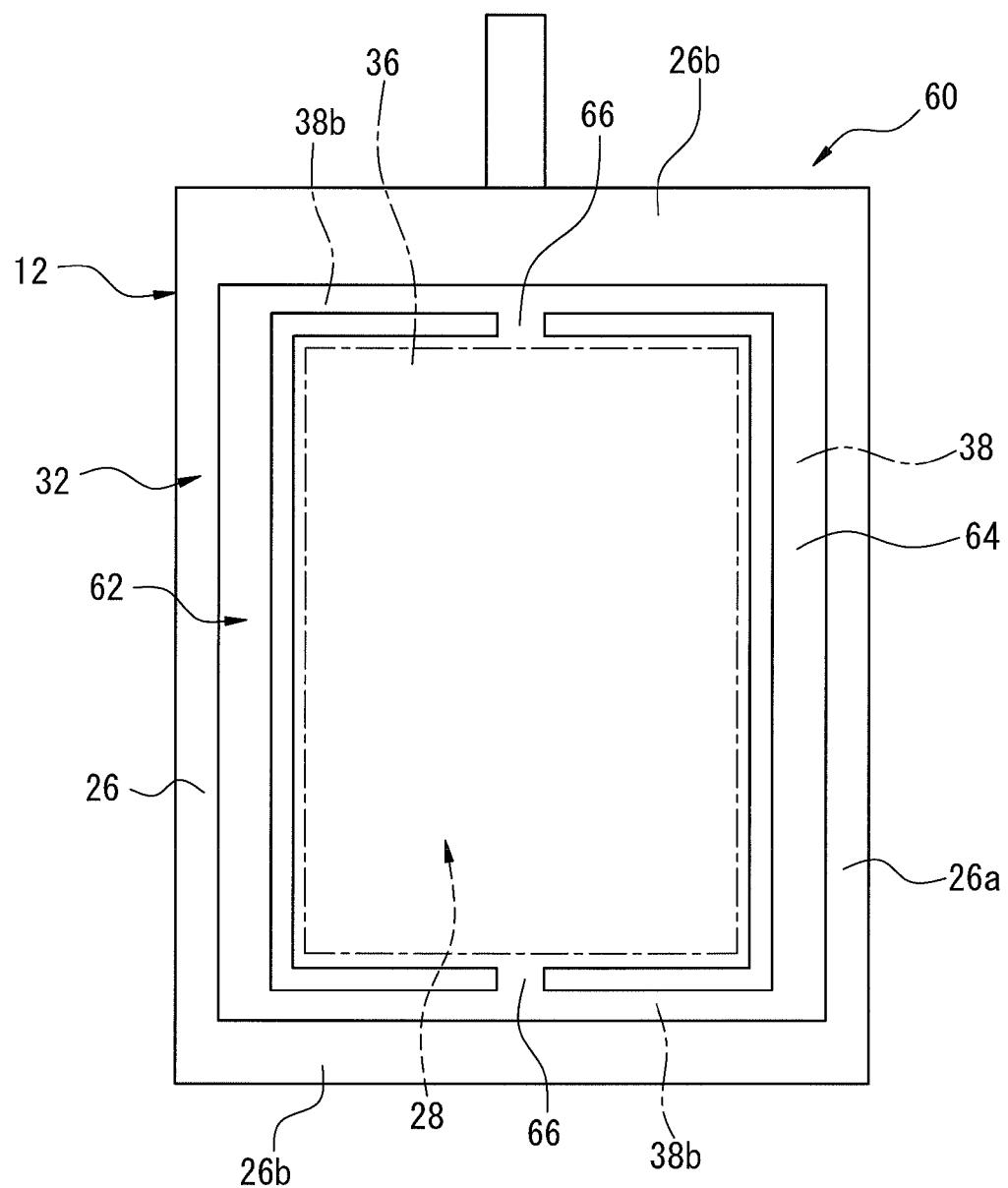
FIG. 7 is a plan view schematically depicting a touch panel according to yet another embodiment.

A touch panel 60 depicted in FIG. 7 includes a gas passage 62 formed in the adhesive layer 26. The gas passage 62 includes a cavity 64 formed so as to extend along the entire circumference of the adhesive layer 26 having a rectangular frame shape, and openings 66 each formed at the center of each of a pair of shorter parts 26b of the adhesive layer 26, which corresponds to the substantially center of each of a pair of mutually opposing sides 38b of the non-operational region 38. Each of the openings 66 opens into the gap 28 defined between the first and second electrode plates 18, 24, and fluidically communicates the cavity 64 to the gap 28. According to this configuration, the gas passage 62 allows gas existing in the gap 28 to circulate in the panel body 12. Each of the cavity 64 and openings 66 is formed by removing a portion of the adhesive layer 26 over the entire thickness thereof, just like the aforementioned cavity 42 and opening 44.

Figure 8:
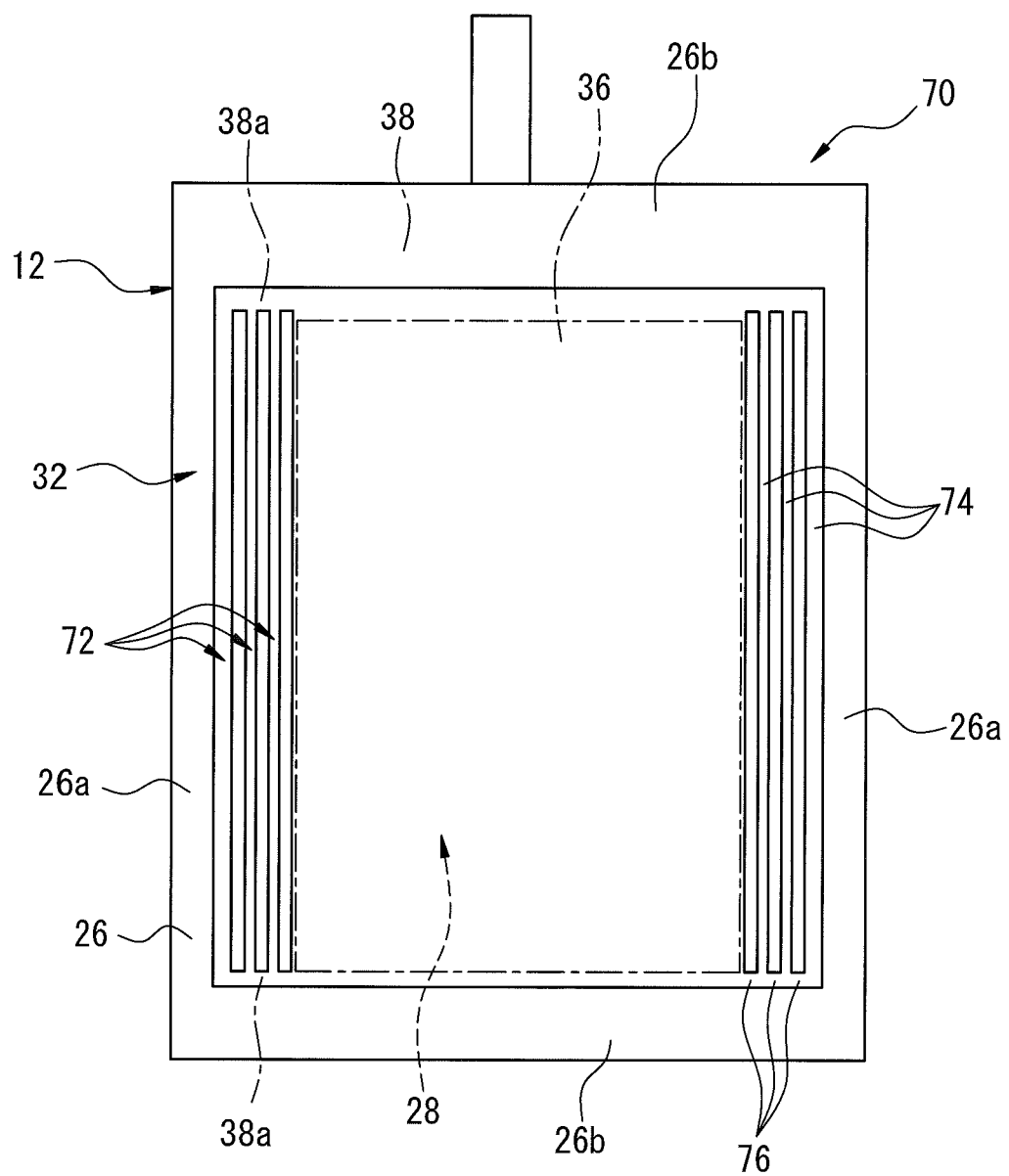
FIG. 8 is a plan view schematically depicting a touch panel according to still another embodiment.

A touch panel 70 depicted in FIG. 8 includes a plurality of gas passages 72 formed in the adhesive layer 26. The gas passages 72 include a plurality of cavities 74 formed so as to extend in the longitudinal direction in each of the pair of longer parts 26a of the adhesive layer 26 having a rectangular frame shape, and openings 76 formed at portions corresponding to each of the four corners 38a of the non-operational region 38, respectively. In the depicted embodiment, three cavities 74 are formed in each longer part 26a, and three openings 76 are formed at each corner 38b, so that six gas passages 72 are formed in the adhesive layer 26. Each of the openings 76 opens into the gap 28 between the first and second electrode plates 18, 24, and communicates each cavity 74 to the gap 28. According to this configuration, each of the gas passages 72 allows gas existing in the gap 28 to circulate in the panel body 12. Each of the cavities 74 and openings 76 is formed by removing a portion of the adhesive layer 26 over the entire thickness thereof, just like the aforementioned cavity 42 and opening 44.

Figure 9:
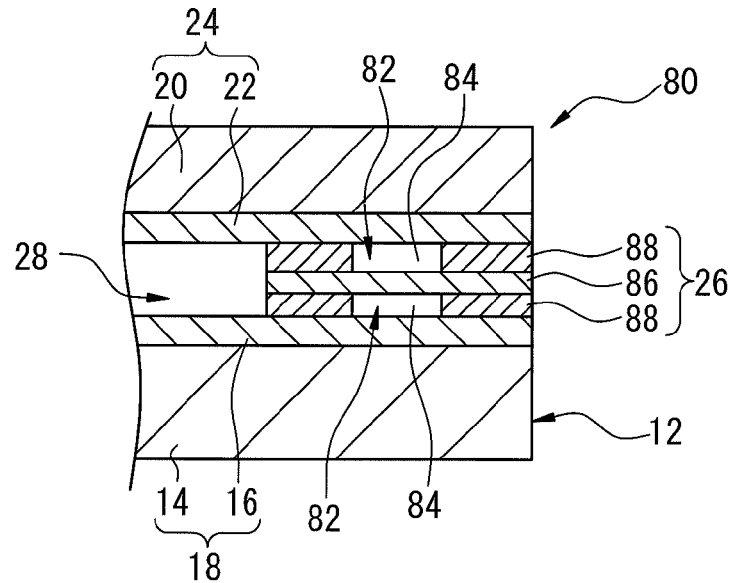
FIG. 9 is a sectional view schematically depicting a portion of a touch panel according to a further embodiment.

A touch panel 80 depicted in FIG. 9 includes gas passages 82 formed in the adhesive layer 26. Each of the gas passages 82 includes a cavity 84 and openings (not depicted) formed in a pattern corresponding to that of the aforementioned gas passage 40. In the touch panel 80, the adhesive layer 26 is formed from a double-faced adhesive tape including a carrier 86 and adhesives 88 laminated on both surfaces of the carrier 86. The gas passages 82 are formed by removing a portion of the adhesives 88 on both sides of the adhesive layer 26 over the entire thickness thereof while leaving the carrier 86. According to this configuration, each of the gas passages 82 also allows a gas existing in the gap 28 to circulate in the panel body 12. In an alternative arrangement, a predetermined portion of the adhesive 88 laminated on either one of the opposite surfaces of the carrier 86 may be removed so as to provide the gas passage 82.

Figure 10:
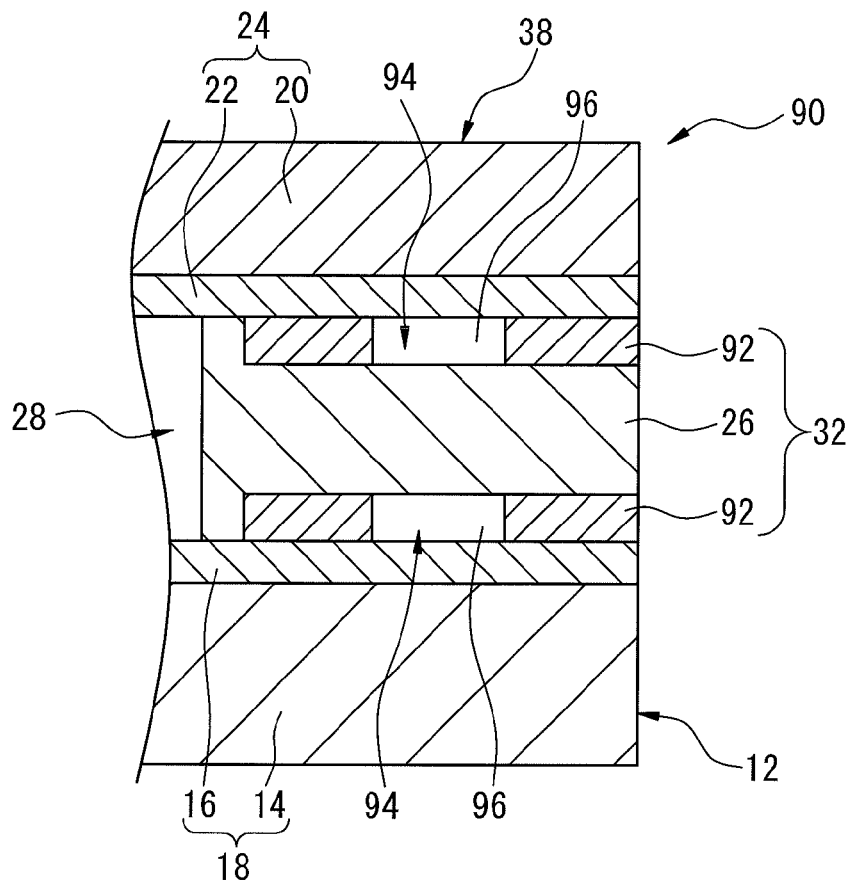
FIG. 10 is a sectional view schematically depicting a portion of a touch panel according to a yet further embodiment.

A touch panel 90 depicted in FIG. 10 includes an insulating layer 92 as a component of the intermediate layer 32, and a plurality of gas passages 94 each formed in the insulating layer 92. In other words, the intermediate layer 32 includes the insulating layer 92 in addition to the adhesive layer 26. Each of the gas passages 94 includes a cavity 96 and openings (not depicted) formed in a pattern corresponding to that of the aforementioned gas passage 40. In the touch panel 90, insulating layers 92 are superimposed respectively on the conductive coats 16, 22 of the first and second electrode plates 18, 24 in the non-operational region 38. The gas passage 94 is formed by removing a portion of each insulating layer 92 over the entire thickness thereof. According to this configuration, each of the gas passages 94 also allows gas existing in the gap 28 to circulate in the panel body 12. In an alternative arrangement, a portion of the insulating layer 92 superimposed on either one of the first and second electrode plates 18, 24 may be removed so as to provide the gas passage 94. Also, the insulating layer 92 may be provided for either one of the first and second electrode plates 18, 24. Further, the gas passage 94 formed in the insulating layer 92 may be provided in combination with the aforementioned gas passage 40, 62, 72, 82 formed in the adhesive layer 26.

Figure 11A:
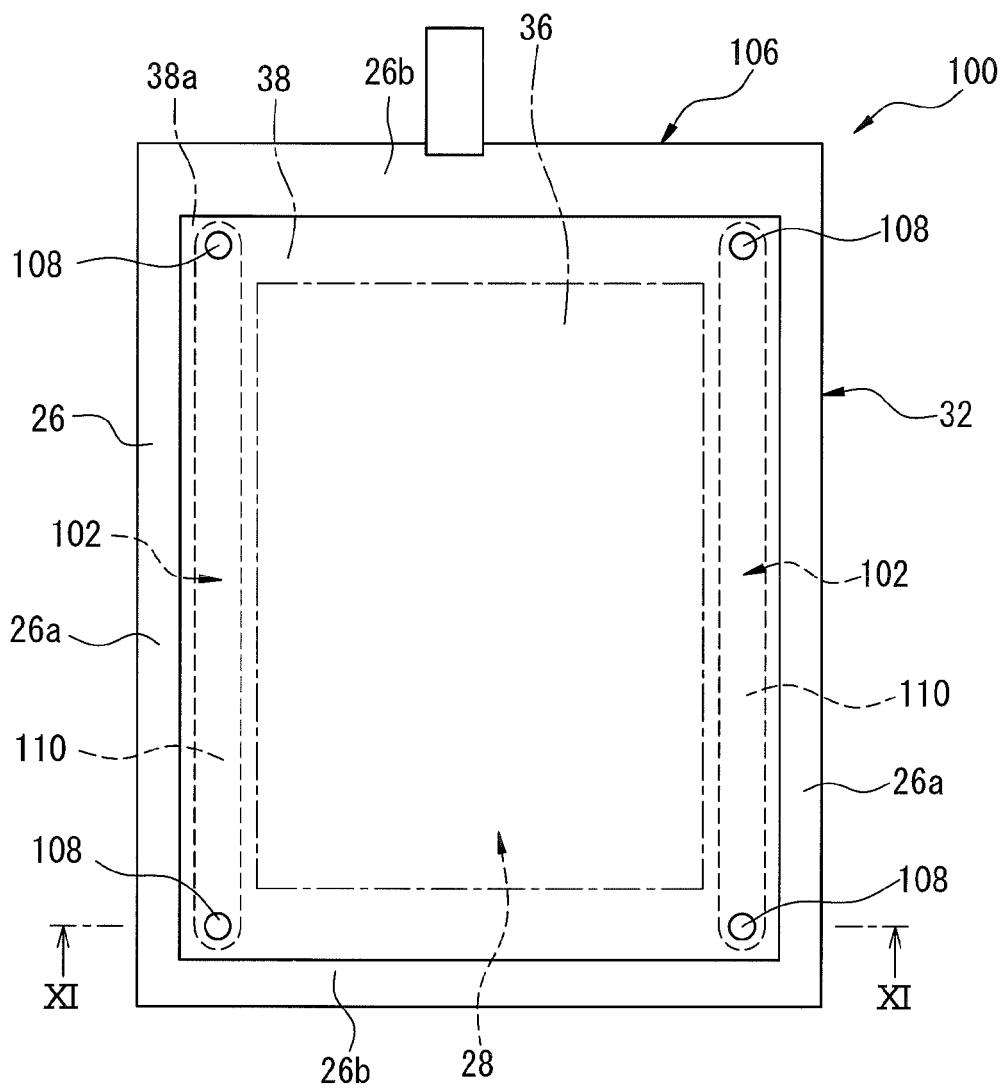
FIG. 11A is a plan view schematically depicting a touch panel according to a still further embodiment.
Figure 11B:
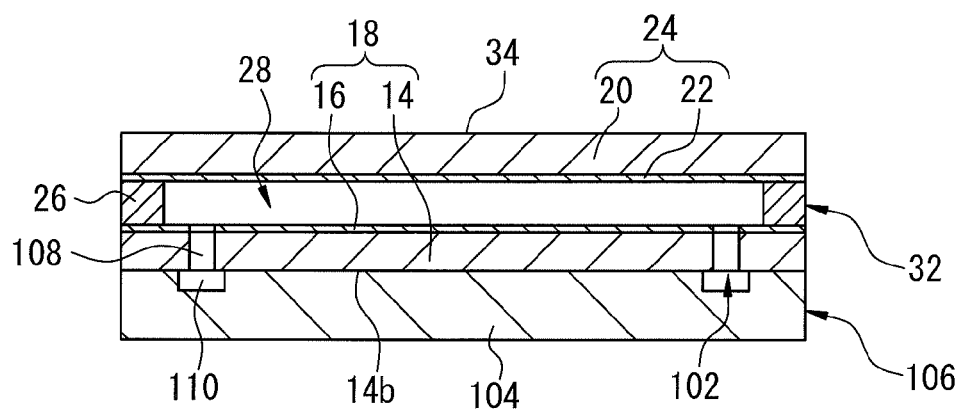
FIG. 11B is a sectional view taken along a line XI-XI of FIG. 11A.

A touch panel 100 depicted in FIGS. 11A and 11B includes a pair of gas passages 102 formed in a component of the touch panel 100 other than the intermediate layer 32. The touch panel 100 also includes a panel body 106 constructed by adding a base 104 to the aforementioned panel body 12. More specifically, the panel body 106 includes the base 104 attached to a surface 14b of the substrate 14 of the first electrode plate 18, opposite to another surface thereof provided with the conductive layer 16. Each of the gas passages 102 includes a pair of through holes 108 penetrating through the first electrode plate 18 in a thickness direction and a circulation path 110 formed in the base 104 and communicating with the pair of through holes 108 (FIG. 11A). Each of the through holes 108 is formed at a position adjacent to and inside a crossing point of each longer part 26a and each shorter part 26b of the adhesive layer 26 having a rectangular frame shape, which corresponds to each of the four corners 38a of the non-operational region 38. Each of the circulation paths 110 extends in parallel to each longer part 26a of the adhesive layer 26, and is fluidically communicated at opposite ends thereof to the gap 28 through the through holes 108.

According to this configuration, each of the gas passages 102 allows gas existing in the gap 28 to circulate in the panel body 106. In an alternative arrangement, the touch panel 100 may include single gas passage 102 formed in parallel to either one of the pair of longer parts 26a of the adhesive layer 26. Further, the circulation path 110 may be formed in a portion of the base 104, which is superimposed on the operational region 36, provided that the visibility of a screen of a display unit (not depicted) through the touch panel 100 is not influenced.

The tough panel 100 may include a cover sheet 48 attached or bonded to the outer surface of the panel body 106 at a side opposite to the base 104 (the input operation surface 34 of the second electrode plate 24). During the bonding process of the cover sheet 48, it is possible to prevent, due to the function of the gas passage 102, the adhesive layer 50 from trapping gas bubbles.

Hereinafter, a touch-panel manufacturing method according to various embodiments, wherein a cover sheet is bonded to the outer surface of a panel body without using a roller 52, will be described with reference to FIGS. 12 to 16B. In the following embodiments, an exemplary touch panel 120 adapted to be manufactured by the method depicted in FIGS. 12 to 16B has a configuration corresponding to the touch panel 46 depicted in FIG. 2, except that the gas passages 40 are eliminated therefrom. More specifically, the touch panel 120 includes a panel body 12 including a pair of electrode plates 18 and 24, each electrode plate 18, 24 provided with a conductive layer 16, 22, in which the electrode plates 18, 24 are fixedly attached to each other so that conductive coats 16, 22 thereof are opposed to each other with a gap 28 defined therebetween; a cover sheet 48 disposed on an outer surface or an input operation surface 34 of the panel body 12; and a pressure-sensitive adhesive layer 50 for bonding entirely the cover sheet to the input operation surface 34 of the panel body 12.

Figure 12:
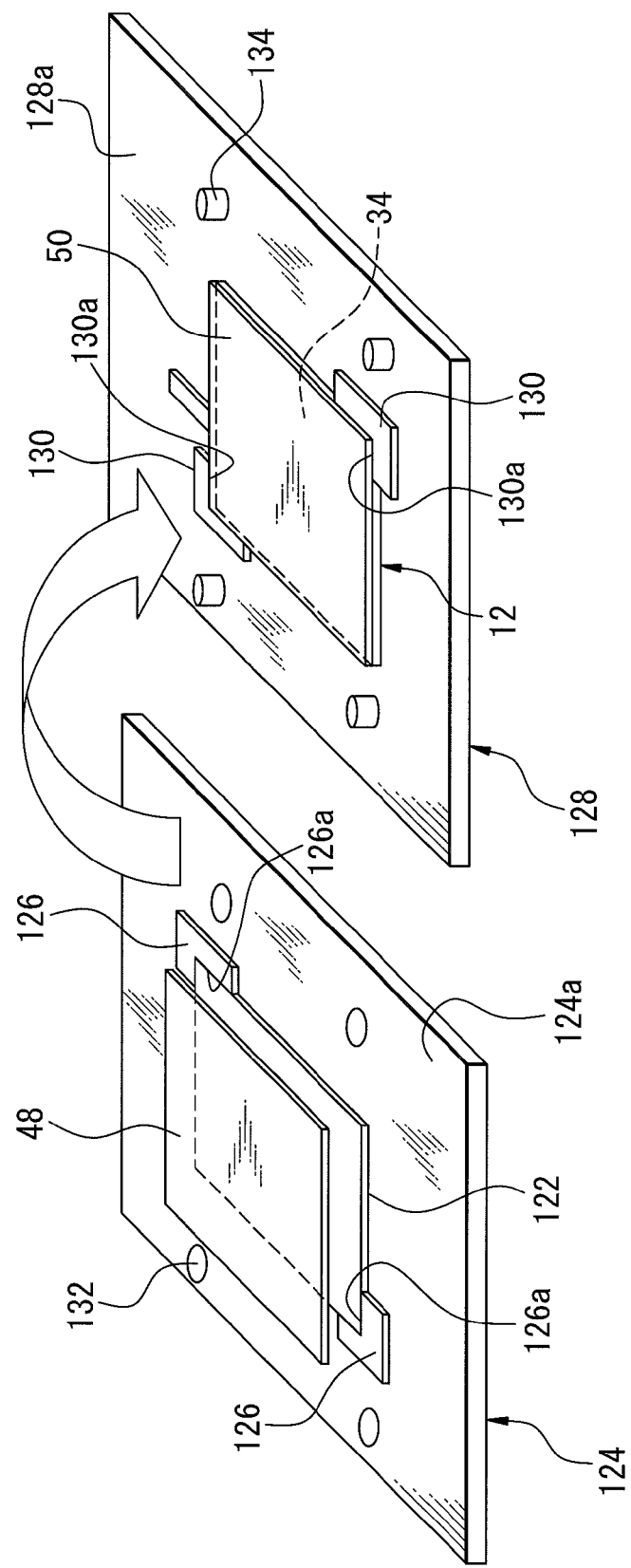
FIG. 12 is a perspective view diagrammatically depicting a touch-panel manufacturing method according to one embodiment.
Figure 13A:
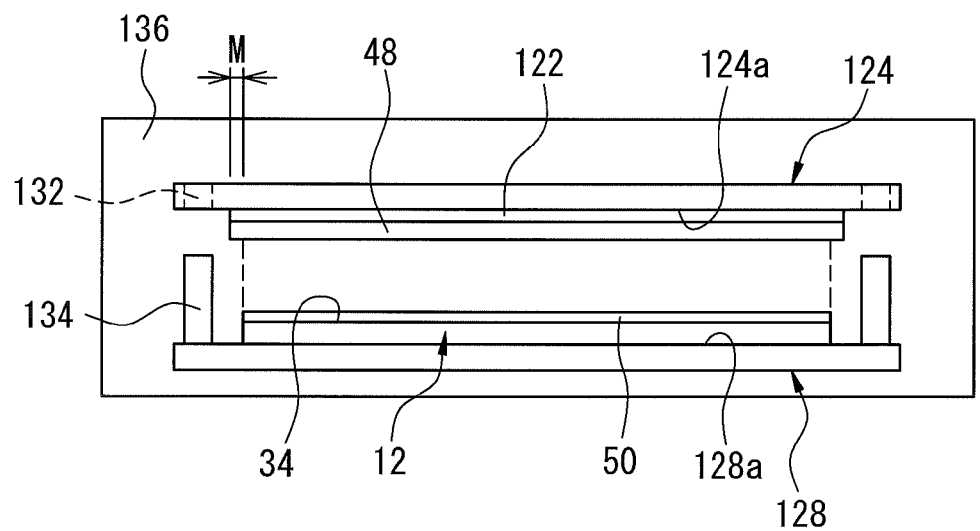
FIG. 13A is a front view diagrammatically depicting a first step in the touch-panel manufacturing method of FIG. 12.
Figure 13B:
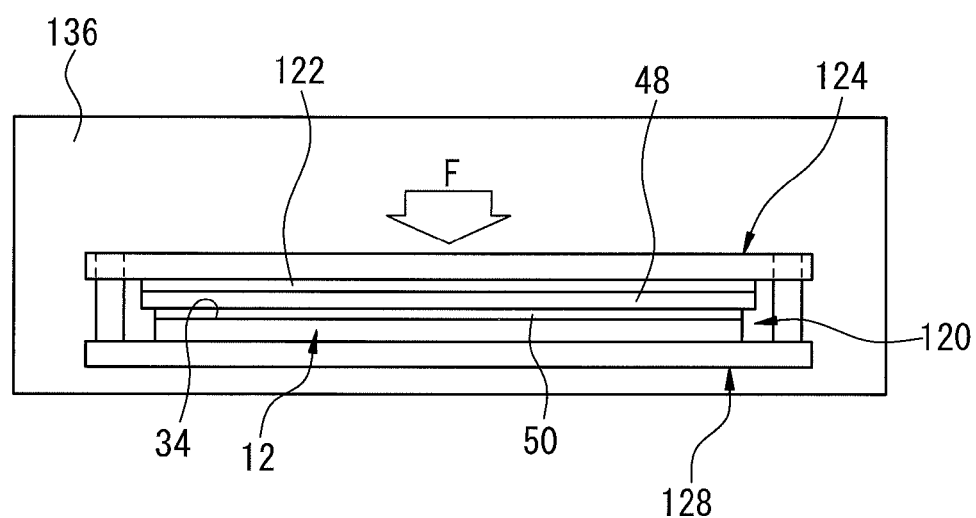
FIG. 13B is a front view diagrammatically depicting a second step in the touch-panel manufacturing method.

The touch-panel manufacturing method depicted in FIGS. 12 to 13B includes a step (FIG. 13A) of flatly supporting the cover sheet 48 on a surface 124a of a support member 124 by using a pressure sensitive adhesive member 122, and a step (FIG. 13B) of pressing the cover sheet 48 flatly supported on the support member 124 against the input operation surface 34 of the panel body 12 with the adhesive layer 50 interposed therebetween. The material of the adhesive member 122 and the material of the adhesive layer 50 are selected so that the adhesive force of the adhesive member 122 exerted between the cover sheet 48 and the support member 124 is smaller than the adhesive force of the adhesive layer 50 exerted between the cover sheet 48 and the panel body 12.

The support member 124 is a flat plate-like member made of metal such as aluminum, plastic, wood, paper, etc., which has a rigidity sufficient to support the flexible cover sheet 48 in a flat form. The adhesive member 122 is disposed as a lamination having a predetermined thickness at a predetermined location on the flat surface 124a of the support member 124. The adhesive member 122 may be provided by, e.g., arranging a double-faced adhesive tape so as to adhere to the surface 124a of the support member 124, or applying an adhesive having fluidity onto the surface 124a of the support member 124. A pair of abutments 126 is provided on the surface 124a of the support member 124 for positioning the cover sheet 48 at a predetermined position. Each abutment 126 has an L-shaped inner edge 126a, on which each of a pair of opposite corners of the cover sheet 48 having a substantially rectangular shape in a planar view can be substantially tightly abutted. The adhesive member 122 is disposed at least in a substantially rectangular region defined inside the pair of abutments 126 and corresponding to the profile of the cover sheet 48. Almost the entire cover sheet 48 is detachably bonded to the adhesive member 122 under a predetermined adhesion force, and is held in a flat form corresponding to the flat surface 124a of the support member 124 at a predetermined position inside the pair of abutments 126. The configuration of the abutment 126 is not limited to the depicted configuration. For example, a predetermined number of abutments can be provided at predetermined positions, each abutment having a linear inner edge, on which each of two pairs of opposite sides of the cover sheet 48 can be substantially tightly abutted.

In the touch-panel manufacturing method of the depicted embodiment, a second support member 128 having a configuration similar to that of the support member 124 is provided. The second support member 128 is a flat plate-like member made of metal such as aluminum, plastic, wood, paper, etc., which has rigidity sufficient to support the panel body 12 at a predetermined position on the flat surface 128a. A pair of abutments 130 is provided on the surface 128a of the second support member 128 for positioning the panel body 12 at a predetermined position. Each abutment 130 has an L-shaped inner edge 130a, on which each of a pair of opposite corners of the panel body 12 having a substantially rectangular shape in a planar view can be substantially tightly abutted. The panel body 12 is flatly supported, e.g., under gravity, on the flat surface 128a of the second support member 12 at a predetermined position inside the pair of abutments 130. The configuration of the abutment 130 is not limited to the depicted configuration. For example, a predetermined number of abutments can be provided at predetermined positions, each abutment having a linear inner edge, on which each of two pairs of opposite sides of the panel body 12 can be substantially tightly abutted.

The first support member 124 is provided in the surface 124a thereof with four locating holes 132 formed at positions outside the region in which the adhesive member 122 is disposed. The second support member 128 is provided in the surface 128a thereof with four locating pins 134 formed at positions outside the region in which the panel body 12 is disposed, the locating pins 134 capable of being respectively fitted into the locating holes 132. The first and second support members 124, 128 are assembled to each other so that the surfaces 124a, 128a thereof are opposed to and parallel to each other with the locating pins 134 being fitted into the corresponding locating holes 132. In the assembled state, the cover sheet 48 supported on the support member 124 through the adhesive member 122 is located relative to the panel body 12 supported on the support member 128, e.g., under gravity, at a relative position where the substantially rectangular profiles thereof are mutually aligned as a finished product of the touch panel 120.

The step of FIG. 13A and the step of FIG. 13B are preferably performed in a vacuum chamber 136. As depicted, in the vacuum chamber 136, the second support member 128 supporting the panel body 12 at a predetermined position on the surface 128a facing upward is disposed on a lower side in a direction of gravity, and the first support member 124 supporting the cover sheet 48 through the adhesive member 122 at a predetermined position on the surface 124a facing downward is disposed above the second support member 128 so that the cover sheet 48 is properly opposed to and parallel to the panel body 12. In this state, the adhesive layer 50 is disposed so as to have a uniform thickness on, e.g., the entire input operation surface 34 of the panel body 12. From this state, the support members 124, 128 are shifted toward each other, and the exposed face of the cover sheet 48 is entirely and almost simultaneously brought into contact with the adhesive layer 50, under the positioning function of the locating holes 132 and the locating pins 134. Further, a predetermined force F is applied to the support members 124, 128 in a direction toward each other, and the entire cover sheet 48 is evenly pressed against the input operation surface 34 of the panel body 12 with the adhesive layer 50 interposed therebetween. In the cover sheet bonding process, since the step of FIG. 13A and the step of FIG. 13B are performed in the vacuum chamber 136, it is possible to prevent the adhesive layer 50 from trapping gas bubbles.

After the cover sheet 48 is bonded to the panel body 12, the first support member 124 is shifted so as to be pulled away from the second support member 128, e.g., outside the vacuum chamber 136, and thereby the panel body 12 supported together with the cover sheet 48 on the first support member 124 is detached from the second support member 128. After that, the panel body 12 is shifted so as to be pulled away from the first support member 124, and thereby the cover sheet 48 is detached from the adhesive member 122 while remaining bonded to the panel body 12, since the adhesive force of the adhesive member 122 exerted between the cover sheet 48 and the support member 124 is smaller than the adhesive force of the adhesive layer 50 exerted between the cover sheet 48 and the panel body 12. In this manner, the touch panel 120 including the cover sheet 48 bonded to the input operation surface 34 of the panel body 12 is manufactured.

In the touch-panel manufacturing method described above, the cover sheet 48 is supported on the surface 124a of the support member 124 by using the adhesive member 122, so that it is possible to readily and promptly support and position the cover sheet 48 having flexibility. It is sufficient to provide the support member 124 with the abutments 126 on which the outer edge of the cover sheet 48 is abutted, and it is not necessary to provide the support member 124 with any other means for supporting the cover sheet 48 at a predetermined position against an external force such as gravity, so that it is possible to simplify the structure of the support member 124. The above configuration has an advantage in a case where the profile of the cover sheet 48 is substantially identical to or slightly larger than the profile of the input operation surface 34 of the panel body 12 and thus an excess marginal portion M of the cover sheet 48 protruding outward from the input operation surface 34 cannot ensure a dimension sufficient for a jig for mechanically supporting the cover sheet 48 to be stably engaged with the marginal portion M (e.g., in the case of $0 \leq M \leq$ about 3 mm).

In the aforementioned configuration in which the cover sheet 48 is flatly supported on the surface 124a of the support member 124 by using the adhesive member 122, the cover sheet 48 can be bonded to the input operation surface 34 by the adhesive layer 50 in a state where the cover sheet 48 is entirely disposed parallel to the input operation surface 34 of the panel body 12, so that it is possible to ensure the flatness of the cover sheet 48 also in the finished product of the touch panel 120. Therefore, it is possible to prevent the cover sheet 48 from impinging on the visibility of a screen of a display unit (not depicted) through the touch panel 120.

In the aforementioned touch-panel manufacturing method, for example, an acrylic adhesive sheet, such as "3M™ adhesive transfer tape 467MP" available from Sumitomo 3M Limited (Tokyo, Japan) can be used as the adhesive member 122. When an adhesive sheet previously shaped in a certain thickness (e.g., 0.05 mm to 0.1 mm) is used as the adhesive member 122, it is possible to easily ensure the flatness of the cover sheet 48 on the support member 124. Also, an acrylic adhesive sheet, such as an optical clear adhesive (OCA) sheet available from DIC Corporation (Tokyo, Japan) can be used as the adhesive layer 50.

In a case where the adhesive member 122 and the adhesive layer 50 made of the above materials are used for the cover sheet 48 formed from a PET film, such as "SUNYTECT® SAT-type" available from Sun A. Kaken Co., Ltd. (Tokyo, Japan), the adhesive force of the adhesive member 122 exerted between the cover sheet 48 and the support member 124 becomes smaller than the adhesive force of the adhesive layer 50 exerted between the cover sheet 48 and the panel body 12, and thus it is possible to safely detach the cover sheet 48 bonded to the panel body 12 from the adhesive member 122.

Further, a material, such as silicone adhesive, with a surface capable of being cleaned by alcohol, water, etc., or a material less deformable by heat, can be used as the adhesive member 122. Any of these materials contributes to ensuring the flatness of the cover sheet 48 on the support member 124.

Figure 14A:
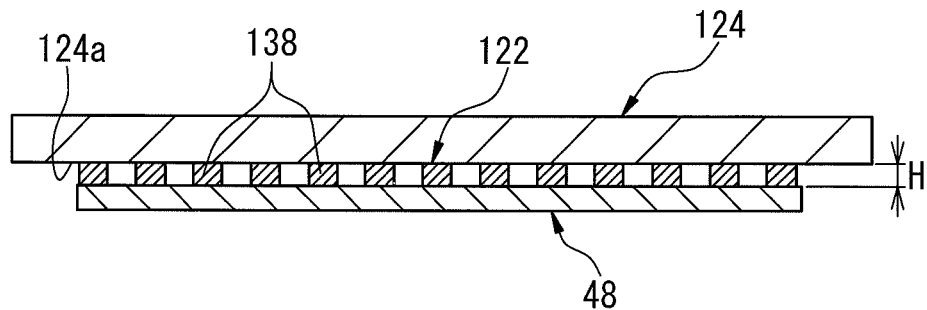
FIG. 14A is a sectional view diagrammatically depicting a first step in a touch-panel manufacturing method according to another embodiment.

FIGS. 14A to 16B depict touch-panel manufacturing methods according to further embodiments, in which structural means is provided to ensure that the adhesive force of the adhesive member 122 exerted between the cover sheet 48 and the support member 124 is smaller than the adhesive force of the adhesive layer 50 exerted between the cover sheet 48 and the panel body 12, which means can be used in place of or in addition to the selection of adhesive materials. In the embodiment depicted in FIG. 14A, the adhesive member 122 includes a plurality of adhesive parts 138 projecting to a uniform height H from the surface 124a of the support member 124. Each adhesive part 138 has a strip shape with a substantially rectangular cross section, and the adhesive parts 138 are provided in a parallel array on the surface 124a of the support member 124. In this configuration, the contact area of the adhesive member 122 adapted to contact the cover sheet 48 is reduced in comparison with the adhesive member 122 depicted in FIG. 12, which is a single continuous layer having entirely uniform thickness on the surface 124a, and therefore, it is possible to reduce the adhesive force of the adhesive member 122 (the adhesive parts 138) if the material thereof is identical to the material of the single-layer adhesive member 122. Further in the above configuration, the adhesive force of the adhesive member 122 can be adjusted by properly selecting the size or number of the adhesive parts 138. In the configuration of FIG. 14A, even if the adhesive member 122 is made of a material identical to the adhesive layer 50, it is possible to ensure that the adhesive force exerted by the adhesive parts 138 of the adhesive member 122 is smaller than the adhesive force exerted by the adhesive layer 50.

Figure 14B:
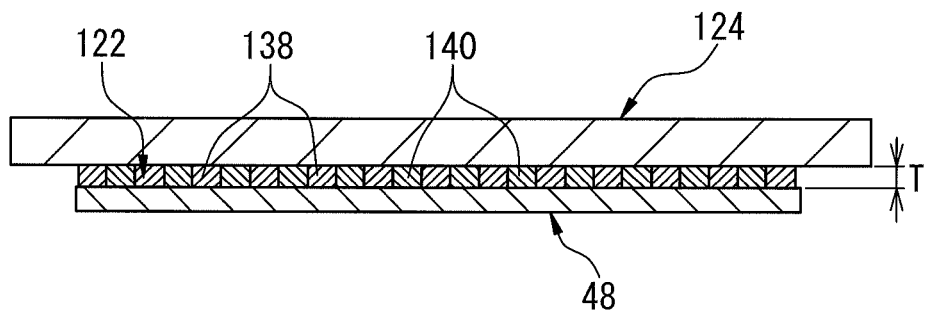
FIG. 14B is a sectional view depicting a modification of the first step of FIG. 14A.
Figure 15:
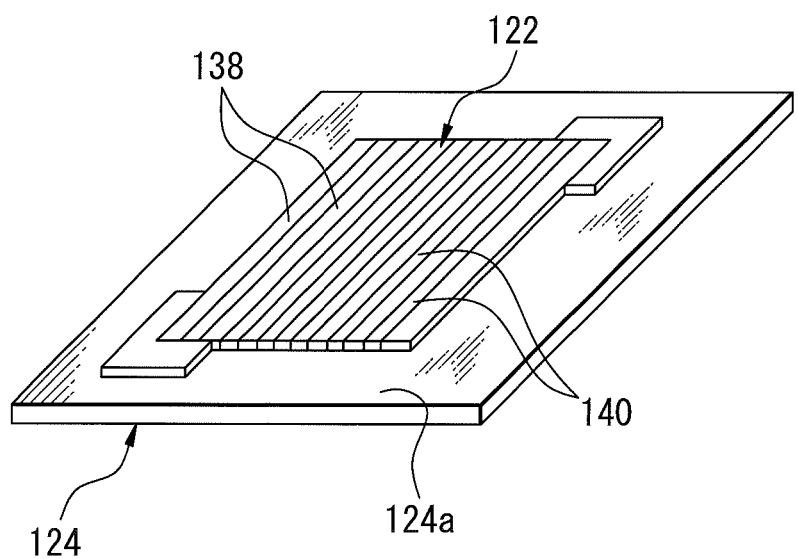
FIG. 15 is a perspective view diagrammatically depicting an adhesive member used in the modification of FIG. 14B.

FIGS. 14B and 15 depict a modification of the embodiment of FIG. 14A, in which a non-adhesive material 140 is disposed between the plurality of adhesive parts 138. In the depicted configuration, the adhesive parts 138 cooperate with a plurality of separate non-adhesive materials 140 to form a layer having a uniform thickness T equal to the aforementioned height H. In this configuration, the adhesive parts 138 reducing the adhesive force of the adhesive member 122 cooperate with the non-adhesive materials 140 so as to flatly support the cover sheet 48 on the support member 124. In the embodiment depicted in FIG. 16A, the adhesive member 122 includes a plurality of adhesive parts 142 projecting to a uniform height H from the surface 124a of the support member 124. Each adhesive part 142 has a strip shape with a substantially triangular cross section, and the adhesive parts 142 are provided in a parallel array on the surface 124a of the support member 124. In this configuration, the contact area of the adhesive member 122 adapted to contact the cover sheet 48 is also reduced in comparison with the adhesive member 122 depicted in FIG. 12, which is a single continuous layer having entirely uniform thickness on the surface 124a, and therefore, it is possible to reduce the adhesive force of the adhesive member 122 (the adhesive parts 142) if the material thereof is identical to the material of the single-layer adhesive member 122, and to further reduce the adhesive force of the adhesive member 122 in comparison with the configuration depicted in FIG. 14A. Further in the configuration of FIG. 16A, the adhesive force of the adhesive member 122 can be adjusted by properly selecting the size or number of the adhesive parts 142, and even if the adhesive member 122 is made of a material identical to the adhesive layer 50, it is possible to ensure that the adhesive force exerted by the adhesive parts 142 of the adhesive member 122 is smaller than the adhesive force exerted by the adhesive layer 50.

Figure 16A:
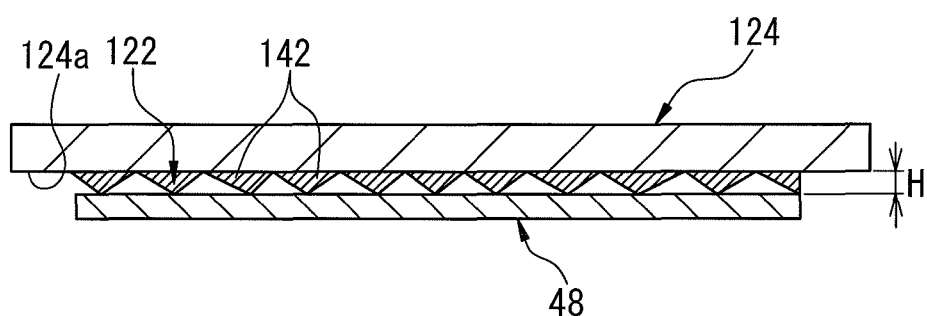
FIG. 16A is a sectional view diagrammatically depicting a first step in a touch-panel manufacturing method according to yet another embodiment.
Figure 16B:
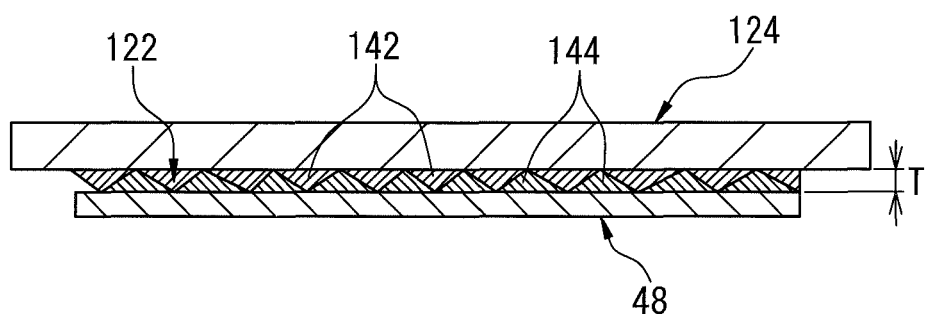
FIG. 16B is a sectional view depicting a modification of the first step of FIG. 16A.

FIG. 16B depicts a modification of the embodiment of FIG. 16A, in which a non-adhesive material 144 is disposed between the plurality of adhesive parts 142. In the depicted configuration, the adhesive parts 142 cooperate with a plurality of separate non-adhesive materials 144 to form a layer having a uniform thickness T equal to the aforementioned height H. In this configuration, the adhesive parts 142 reducing the adhesive force of the adhesive member 122 cooperate with the non-adhesive materials 140 so as to flatly support the cover sheet 48 on the support member 124. Note that the configuration of the adhesive parts 138, 142 constituting the adhesive member 122 is not limited to the depicted embodiment. For example, the adhesive parts having various sectional shapes, or dot-shaped adhesive parts dispersedly disposed on the surface 124a, may be used.

The panel body 12 constituting the touch panel 120 is provided with the operational region 36 allowing an input operation and the non-operational region 38 adjacent to the operational region 36. Generally, in the non-operational region 38, it is not necessary to consider the visibility of a screen of a display unit (not depicted) through the touch panel 120. Therefore, in the touch-panel manufacturing method depicted in FIGS. 12 to 16B, it is sufficient that at least a portion of the adhesive member 122 superimposed on the entire operational region 36 is formed as a layer having a uniform thickness. Therefore, the adhesive member 122 may be configured in such a manner that a portion thereof superimposed on the entire operational region 36 is formed from a continuous adhesive sheet having an entirely uniform thickness or a layer including the adhesive parts 138, 142 and the non-adhesive materials 140, 144 and having a uniform thickness as depicted in FIGS. 14B, 16B, while a portion thereof superimposed on the non-operational region 38 is formed from the adhesive parts 138, 142 depicted in FIGS. 14A, 16A. Alternatively, no adhesive member 122 may be provided in a region superimposed on the non-operational region 38.

While the invention has been described with reference to specific embodiments, it will be understood by those skilled in the art that various changes and modifications may be made thereto without departing from the scope of the following claims.

The invention claimed is:

1. A touch panel comprising:
   a panel body including
   a first electrode plate provided with a first conductive layer,
   a second electrode plate provided with a second conductive layer that faces the first conductive layer with a gap defined therebetween,
   an intermediate layer interposed between the first electrode plate and the second electrode plate along outer peripheries of the first and second electrode plates, the intermediate layer including a rectangular frame-shaped first portion provided along an outer periphery of the panel body and a second portion provided inside the first portion; and
   a gas passage configured to allow a gas existing in the panel body to circulate in the panel body, the gas passage including a cavity provided as a space between the first portion and the second portion and at least two openings provided at respective opposite ends of the cavity, the openings configured to communicate the cavity to the gap.

2. The touch panel of claim 1, wherein the intermediate layer includes an adhesive layer for fixedly bonding the pair of electrode plates to each other, and wherein the gas passage is formed in the adhesive layer.

3. The touch panel of claim 1, wherein the intermediate layer includes an insulating layer superimposed on the conductive layer of at least one of the pair of electrode plates, and wherein the gas passage is formed in the insulating layer.

4. The touch panel of claim 1, wherein a plurality of gas passages are formed in the intermediate layer.

5. The touch panel of claim 1, wherein the panel body is provided with an operational region including the gap and a frame-shaped non-operational region surrounding the operational region, and wherein the gas passage communicates with the gap in at least two corners or at least two sides of the non-operational region.

6. A touch panel, comprising:
   a panel body including
   a pair of electrode plates and a base, each electrode plate provided with a conductive layer, the electrode plates being fixedly attached to each other so that conductive layers thereof are opposed to each other with a gap defined therebetween, and the base being attached to a surface of a first one of the pair of electrode plates, opposite to another surface thereof provided with the conductive layer; and
   a gas passage provided in the panel body and configured with at least two openings between the gas passage and the gap, allowing a gas existing in the gap to circulate in the panel body, the gas passage including a pair of through holes penetrating through the first electrode plate in a thickness direction and a circulation path formed in the base and communicating with the pair of through holes.

7. The touch panel of claim 6, further comprising a cover sheet attached to an outer surface of the panel body at a side opposite to the base.

8. A method of manufacturing a touch panel, the touch panel comprising a panel body including a pair of electrode plates, each electrode plate provided with a conductive layer, in which the electrode plates are fixedly attached to each other so that conductive coats thereof are opposed to each other with a gap defined therebetween; a cover sheet disposed on an outer surface of the panel body; and an adhesive layer for bonding the cover sheet to the outer surface of the panel body; the method comprising:
   supporting the cover sheet on a surface of a support member; and
   pressing the cover sheet supported on the support member against the outer surface of the panel body with the adhesive layer interposed therebetween,
   wherein adhesive force of the adhesive member exerted between the cover sheet and the support member is smaller than adhesive force of the adhesive layer exerted between the cover sheet and the panel body.

9. The method of claim 8, wherein the adhesive member includes a plurality of adhesive parts projecting to a uniform height from the surface of the support member.

10. The method of claim 9, wherein a non-adhesive material is disposed between the plurality of adhesive parts, and wherein the plurality of adhesive parts cooperate with the non-adhesive material to form a layer having a uniform thickness.

* * * * *